United States Patent
Szymczyk et al.

(10) Patent No.: US 10,482,517 B2
(45) Date of Patent: Nov. 19, 2019

(54) PROVIDING A SIMULATION OF WEARING ITEMS SUCH AS GARMENTS AND/OR ACCESSORIES

(71) Applicant: ZUGARA, INC., Culver City, CA (US)

(72) Inventors: Matthew Szymczyk, Manhattan Beach, CA (US); Aaron Von Hungen, Culver City, CA (US); Blake Callens, Toluca Lake, CA (US); Hans Forsman, Venice, CA (US); Jack Benoff, Hermosa Beach, CA (US)

(73) Assignee: ZUGARA, INC., Culver City, CA (US)

( * ) Notice: Subject to any disclaimer, the term of this patent is extended or adjusted under 35 U.S.C. 154(b) by 381 days.

(21) Appl. No.: 14/936,444

(22) Filed: Nov. 9, 2015

(65) Prior Publication Data

US 2016/0063592 A1    Mar. 3, 2016

Related U.S. Application Data (63) Continuation of application No. 13/592,159, filed on Aug. 22, 2012, now Pat. No. 9,183,581, which is a
(Continued)

(51) Int. Cl.
G06F 3/01    (2006.01)
G06Q 30/06   (2012.01)
(Continued)

(52) U.S. Cl.
CPC ......... *G06Q 30/0623* (2013.01); *G06F 3/017* (2013.01); *G06F 3/0482* (2013.01);
(Continued)

(58) Field of Classification Search
None
See application file for complete search history.

(56) References Cited

U.S. PATENT DOCUMENTS

| 4,539,585 A | 9/1985 | Spackova et al. ............... 358/93 |
| 5,680,528 A | 10/1997 | Korszun ....................... 395/135 |

(Continued)

FOREIGN PATENT DOCUMENTS

WO    WO 2011/019965    2/2011

OTHER PUBLICATIONS

Non-Final Office Action dated Jan. 25, 2017 in corresponding U.S. Appl. No. 14/727,863 (17 pages).
(Continued)

*Primary Examiner* — Aniss Chad
*Assistant Examiner* — Bernard E Cothran
(74) *Attorney, Agent, or Firm* — Pillsbury Winthrop Shaw Pittman, LLP (57) ABSTRACT

A user may simulate wearing real-wearable items, such as virtual garments and accessories. A virtual-outfitting interface may be provided for presentation to the user. An item-search/selection portion within the virtual-outfitting interface may be provided. The item-search/selection portion may depict one or more virtual-wearable items corresponding to one or more real-wearable items. The user may be allowed to select at least one virtual-wearable item from the item-search/selection portion. A main display portion within the virtual-outfitting interface may be provided. The main display portion may include a composite video feed that incorporates a video feed of the user and the selected at least one virtual-wearable item such that the user appears to be wearing the selected at least one virtual-wearable item in the main display portion.

20 Claims, 3 Drawing Sheets

Related U.S. Application Data continuation of application No. 12/822,168, filed on Jun. 23, 2010, now Pat. No. 8,275,590.

(60) Provisional application No. 61/233,364, filed on Aug. 12, 2009, provisional application No. 61/233,377, filed on Aug. 12, 2009.

(51) Int. Cl.
| | |
|---|---|
| G06Q 50/00 | (2012.01) |
| G06T 19/00 | (2011.01) |
| H04N 5/232 | (2006.01) |
| G06F 3/0481 | (2013.01) |
| G06F 3/0484 | (2013.01) |
| G06F 3/0482 | (2013.01) |

(52) U.S. Cl.
CPC ...... *G06F 3/04817* (2013.01); *G06F 3/04842* (2013.01); *G06Q 30/0603* (2013.01); *G06Q 50/01* (2013.01); *G06T 19/006* (2013.01); *H04N 5/23229* (2013.01)

(56) References Cited

U.S. PATENT DOCUMENTS

| | | | | |
|---|---|---|---|---|
| 5,724,522 | A | 3/1998 | Kagami et al. | 395/226 |
| 5,850,222 | A | 12/1998 | Cone | 345/418 |
| 5,930,769 | A | 7/1999 | Rose | 705/27 |
| 5,950,173 | A | 9/1999 | Perkowski | 705/26 |
| 6,307,568 | B1 | 10/2001 | Rom | 345/629 |
| 6,310,627 | B1 | 10/2001 | Sakaguchi | 345/630 |
| 6,546,309 | B1 | 4/2003 | Gazzuolo | 700/132 |
| 6,665,577 | B2 | 12/2003 | Onyshkevych et al. | 700/130 |
| 6,701,207 | B1 | 3/2004 | Gazzuolo | 700/132 |
| 6,882,897 | B1 | 4/2005 | Fernandez | 700/132 |
| 6,901,379 | B1 | 5/2005 | Balter et al. | 705/27 |
| 6,903,756 | B1 | 6/2005 | Giannini | 345/747 |
| 6,965,873 | B1 | 11/2005 | Rhoads | 705/26 |
| 7,013,290 | B2 | 3/2006 | Ananian | 705/27 |
| 7,039,486 | B2 | 5/2006 | Wang | 700/117 |
| 7,062,454 | B1 | 6/2006 | Giannini et al. | 705/27 |
| 7,113,918 | B1 | 9/2006 | Ahmad et al. | 705/26 |
| 7,133,839 | B2 | 11/2006 | Inoue et al. | 705/27 |
| 7,149,665 | B2 | 12/2006 | Feld et al. | 703/2 |
| 7,418,407 | B2 | 8/2008 | Giannini | 705/26 |
| 7,433,753 | B2 | 10/2008 | Okada et al. | 700/130 |
| 7,548,794 | B2 | 6/2009 | Vandergriff et al. | 700/132 |
| 7,712,035 | B2 | 5/2010 | Giannini | 715/747 |
| 7,714,912 | B2 | 5/2010 | Faisman et al. | 348/239 |
| 7,905,028 | B2 | 3/2011 | Sieber | 33/512 |
| 8,078,498 | B2 | 12/2011 | Edmark et al. | 705/26.1 |
| 8,078,499 | B1 | 12/2011 | Giannini et al. | 705/26.1 |
| 8,982,110 | B2 | 3/2015 | Saban et al. | |
| 9,595,137 | B2 | 3/2017 | Sharma et al. | |
| 2001/0026272 | A1* | 10/2001 | Feld | A41H 3/007 345/419 |
| 2002/0004753 | A1 | 1/2002 | Perkowski | 705/26 |
| 2002/0024517 | A1 | 2/2002 | Yamaguchi et al. | 345/424 |
| 2002/0024528 | A1 | 2/2002 | Lambertsen | 345/646 |
| 2002/0138170 | A1* | 9/2002 | Onyshkevych | G06Q 30/06 700/130 |
| 2002/0158916 | A1 | 10/2002 | Gusler et al. | 345/850 |
| 2002/0169687 | A1 | 11/2002 | Perkowski | 705/26 |
| 2003/0101105 | A1* | 5/2003 | Vock | G06Q 10/043 705/27.2 |
| 2003/0110099 | A1 | 6/2003 | Trajkovic et al. | 705/27 |
| 2004/0004633 | A1 | 1/2004 | Perry et al. | 345/728 |
| 2005/0131776 | A1 | 6/2005 | Perotti et al. | 705/27 |
| 2005/0234782 | A1 | 10/2005 | Schackne et al. | 705/27 |
| 2006/0080182 | A1 | 4/2006 | Thompson et al. | 705/26 |
| 2006/0271448 | A1 | 11/2006 | Inoue et al. | 705/26 |
| 2007/0220540 | A1 | 9/2007 | Walker et al. | 725/14 |
| 2007/0268312 | A1 | 11/2007 | Marks et al. | 345/633 |
| 2007/0276721 | A1 | 11/2007 | Jackson | 705/10 |
| 2008/0163344 | A1 | 7/2008 | Yang | 726/4 |
| 2008/0255920 | A1 | 10/2008 | Vandergriff et al. | 705/10 |
| 2009/0115777 | A1 | 5/2009 | Reyers Moreno | 345/419 |
| 2009/0271705 | A1 | 10/2009 | Sheng et al. | 715/733 |
| 2010/0030578 | A1 | 2/2010 | Siddique et al. | 705/3 |
| 2011/0040539 | A1 | 2/2011 | Szymczyk et al. | 703/6 |
| 2011/0106662 | A1 | 5/2011 | Stinchcomb | 705/26.43 |
| 2011/0187743 | A1 | 8/2011 | Hwang et al. | 345/633 |
| 2014/0085330 | A1 | 3/2014 | Sugita et al. | |
| 2014/0104316 | A1 | 4/2014 | Sharma et al. | |
| 2014/0225978 | A1 | 8/2014 | Saban et al. | |
| 2015/0206349 | A1 | 7/2015 | Rosenthal et al. | |

OTHER PUBLICATIONS

Zhang et al., "An Intelligent Fitting Room Using Multi-Camera Perception", *ACM*, Jan. 2008, pp. 60-69.

CPENNEY, "Virtual Dressing Room", *Seventeen Magazine*, Jan. 1, 2005, 3 pages.

BBC News, "Virtual Dummy to Try on Clothes", Jan. 27, 2004, 2 pages.

"New Interactive Video/Augmented Reality Apps Unveiled for Clothes Shopping, Wimbledon", submitted by tracyswedlow, Jun. 24, 2009, 3 pages.

Wacker, Markus, et al., "Simulation and Visualisation of Virtual Textiles for Virtual Try-On", WSI/GRIS, *RJTA*, vol. 9, No. 1, 2005, pp. 37-47.

Chittaro, Luca, et al., "3D Virtual Clothing: from Garment Design to Web3D Visualization and Simulation", *Web 3D '03 Proceedings of the 8th International Conference on 3D Web Technology*, 2003, 12 pages.

Kjaerside et al., "ARDressCode: Augmented Dressing Room with Tag-based Motion Tracking and Real-Time Clothes Simulation", *Central European Multimedia and Virtual Reality Conference*, 2005, 6 pages.

Eisert et al., "3-D Tracking of Shoes for Virtual Mirror Applications", 2008, 6 pages.

Begole et al., "Designed to Fit: Challenges of Interaction Design for Clothes Fitting Room Technologies", *Human-Computer Interaction, Part IV*, HCII 2009, LNCS 5613, 2009, pp. 448-457.

Kawahara et al., "Virtual Fitting Room with Spoken Dialogue Interaction", ISCA Archive, 2004, 4 pages.

Zhang et al., "Real-Time Clothes Comparison Based on Multi-View Vision", Sep. 2008.

Divivier et al., "Virtual Try-On: Topics in Realistic, Individualized Dressing in Virtual Reality", Feb. 2004, 17 pages.

Thalmann et al., "An Overview of Virtual Humans", Jul. 2004, 25 pages.

Lyons et al., "Multimodal Interactive Advertising", 1998.

* cited by examiner

PROVIDING A SIMULATION OF WEARING ITEMS SUCH AS GARMENTS AND/OR ACCESSORIES

CROSS REFERENCE TO RELATED APPLICATIONS

The present application is a continuation of U.S. patent application Ser. No. 13/592,159 filed Aug. 22, 2012, now U.S. Patent No. 9,183,581, which is a continuation of U.S. patent application Ser. No. 12/822,168 filed Jun. 23, 2010, now U.S. Pat. No. 8,275,590, which claims the priority benefit of U.S. Provisional Patent Application Ser. No, 61/233,364 filed Aug. 12, 2009 and U.S. Provisional Patent Application Ser. No. 61/233,377 filed Aug. 12, 2009, the disclosures of which are incorporated by reference herein their entireties.

FIELD OF THE INVENTION

The invention relates to allowing a user to simulate wearing wearable items by providing a composite video feed that incorporates a live video feed of the user and at least one virtual-wearable item, which represents at least one real-wearable item, such that the user appears to be wearing the at least one real-wearable item in the composite video feed.

BACKGROUND OF THE INVENTION

Typically, in e-commerce environments (e.g., an online storefront), potential customers are presented images of goods offered for sale. In the case of wearable goods, such as clothing and accessories, a potential customer must speculate as to whether they will like a given wearable good once they try it on. In order to try on a wearable good offered for sale in a conventional e-commerce environment, however, a customer must first purchase the good and wait for its delivery. This barrier to affirming a desire to purchase a good may prevent the majority of potential customers who visit a given e-commerce environment from actually making purchase.

SUMMARY

One aspect of the invention relates to a system configured to provide a simulation of wearing real-wearable items, according to one or more implementations of the invention. According to exemplary implementations, the user may be presented one or more virtual-wearable items, such as via a user interface. The virtual-wearable items may include virtual garments (e.g., a virtual shirt, a virtual hat, virtual pants, and/or other virtual garments), virtual accessories (e.g., virtual jewelry, virtual hats, and/or other virtual accessories), and/or other virtual-wearable items. The virtual-wearable items may represent real-wearable items. The user may select at least one of the virtual-wearable item to virtually "try on" at least one corresponding real-wearable item. A composite image may be presented to the user in real time or near-real time, which may incorporate a live video feed of the user and one or more selected virtual-wearable items such that the user appears to be wearing real-wearable items corresponding to the selected virtual-wearable item(s) in the composite video feed.

In some implementations, the user may be presented a virtual-outfitting interface. The virtual-outfitting interface may include several portions, one of which may include the composite video feed. Various inputs such as motions of the user may be tracked such that the user may interact with one or more of the portions of the virtual-outfitting interface. For example, the user may change the virtual-wearable item displayed, purchase a real-wearable item associated with a displayed virtual-wearable item, obtain a snapshot or video clip of the user virtually wearing a real-wearable item, share snapshots or video clips such as via social-networking services, view and interact with friends that are also virtually trying on real-wearable items, and/or perform other actions in conjunction with the system.

In some implementations, the system may include one or more virtual-commerce-environment servers and/or other components. The system may operate in communication and/or coordination with one or more external resources. Users may interface with the system and/or the external resources via client computing platforms. Components of the system, the virtual-commerce-environment servers, the external resources, and/or the client computing platforms may be operatively linked via one or more electronic communication links. For example, such electronic communication links may be established, at least in part, via a network, which may include the Internet and/or other networks.

A given client computing platform may include one or more processors configured to execute computer program modules. The computer program modules may be configured to enable one or more users associated with the given client computing platform to interface with the system and/or the external resources, and/or provide other functionality attributed herein to client computing platforms. A given client computing platform may also be communicatively coupled with an imaging device, or have such an imaging device integrated therewith. Examples of imaging devices an analog camera, a digital camera, a 2D camera, a stereo camera, a 3D camera, and/or other imaging devices. An imaging device may be configured to capture still images and/or a live video feed of a user of a given client computing platform. Imaging devices associated with individual ones of the client computing platforms may be configured to provide information (e.g., a video feed, one or more images, and/or other information) to one or more modules associated with the virtual-commerce-environment servers.

Individual ones of the client computing platforms may include user interfaces. A user interface included in a given client computing platform may be configured to provide an interface between the virtual-commerce-environment servers and a user of the given client computing platform through which the user may provide information to and/or receive information from the virtual-commerce-environment servers. This enables data, results, and/or instructions and any other communicable items, collectively referred to as "information," to be communicated between the user and virtual-commerce-environment servers.

The external resources may include sources of information, hosts and/or providers of virtual commerce environments outside of the system, external entities participating with the system, and/or other resources. In some implementations, some or all of the functionality attributed herein to the external resources may be provided by resources included in the system.

The virtual-commerce-environment servers may comprise electronic storage, one or more processors, and/or other components. The electronic storage may comprise electronic storage media that electronically stores information. The processor(s) may be configured to provide information processing capabilities in the virtual environments servers.

The processor may be configured to execute a virtual outfitting program. The virtual outfitting program may include one or more computer program modules and/or instructions that may be executed to provide a simulation of wearing real-wearable items. The one or more computer program modules may include one or more of a virtual-outfitting-interface module, a motion-capture module, an item-search/selection module, a composite-imaging module, a conferencing module, a purchase module, a screen-capture module, a social-networking module, an interface-control module, and/or other modules.

The virtual-outfitting-interface module may be configured to provide, for presentation to one or more users, a virtual-outfitting interface. The virtual-outfitting interface may be presented to a user via a user interface of a given client computing platform. The virtual-outfitting interface may include an item-search/selection portion, a main display portion, a current item details portion, a conferencing portion, a tools portion, a snapshot portion, and/or other portions.

A user may interact with one or more portions of the virtual-outfitting interface. In some implementations, the user may interact with one or more portions via a user interface associated with a given client computing platform. The user may interact with one or more portions by voice command, according to some implementations. The user may interact with one or more portions, in accordance with some implementations, using motions and/or gestural commands.

The motion-capture module may be configured to track motion of the user. Motion of the user tracked by the motion-capture module may allow the user to interact with one or more portions of the virtual-outfitting interface. Such interactions may include gestural commands and/or other commands associated with motions of the user. The motion-capture module may utilize images and/or video of the user obtained by an imaging device associated with one of the client computing platforms in order to track motion of the user. Exemplary implementations of motion tracking and utilization thereof are described further in connection with one or more portions of the virtual-outfitting interface.

The item-search/selection module may be configured to provide the item-search/selection portion of the virtual-outfitting interface. The item-search/selection portion may present one or more virtual-wearable items to a user. As mentioned above, virtual-wearable items may include one or more of a virtual garment, a virtual accessory, and/or other virtual-wearable items. In some implementations, a given virtual-wearable item may represent a real-wearable item. In some implementations, the item-search/selection portion may display an image or other representation (e.g., a textual representation) of a virtual-wearable item. The user may manipulate the item-search/selection portion using an interface included in a given client computing platform and/or other techniques described herein, such as gestures and/or voice commands.

According to some implementations, the item-search/selection module may be configured to allow a user to search available virtual-wearable items. Available items may be presented in the item-search/selection portion, and may be searched according to type, size, style, brand, vendor, price, availability, and/or other attributes associated with real-wearable items. In some implementations, some or all searching capabilities may be provided by a third-party service (e.g., Amazon.com™, Google™, and/or other third parties). The item-search/selection module may be configured to provide suggestions of one or more real-wearable items based on one or more search criterions inputted by the user.

In some implementations, the item-search/selection module may be configured to allow a user to select one or more virtual-wearable items presented in the item-search/selection portion. Selected virtual-wearable items may be "tried-on" virtually by the user, as described further herein. In some implementations, one or more virtual-wearable items presented in the item-search/selection portion may be pre-selected by one or more users, such as via an online storefront.

The item-search/selection module may be configured to manage a queue of selected virtual-wearable items, in some implementations. Some or all of the queue of selected virtual-wearable items may be presented in the item-search/selection portion. The user may add, subtract, reorder, scroll through, browse, and/or otherwise manage selected virtual-wearable items included in such a queue. Some implementations may include a default queue that includes a predetermined set of virtual-wearable items. The user may select one or more virtual-wearable items from to queue in order to virtually "try on" real-wearable items corresponding to selected virtual-wearable items.

The composite-imaging module may be configured to provide the main display portion of the virtual-outfitting interface. The main display portion may include one or more images and/or video of the user virtually trying on one or more real-wearable items that correspond to one or more selected virtual-wearable items. In such images and/or video, the one or more selected virtual-wearable items may be visually overlaid on the user in a position in which the user would normally wear corresponding real-wearable items. The position of the virtual-wearable item in the main display portion may be determined manually by the user (e.g., drag and drop) using a user interface of a given client computing platforms, and/or may be determined wholly or partially by the motion-capture module, as described further herein. In some implementations, the main display portion may include a composite video feed that incorporates a video feed of the user and one or more virtual-wearable items selected by the user via the item-search/selection module. The video feed of the user may be obtained by an imaging device associated with one of the client computing platforms. Presentation of the composite video feed may be in real time or near-real time.

The motion-capture module may be configured to position and/or size a virtual-wearable item relative to the user's body in an image and/or video in the main display portion. Some implementations may utilize augmented reality technology to position a virtual-wearable item relative to the user's body. The motion-capture module may utilize an augmented-reality marker in order position a virtual-wearable item. An augmented-reality marker may include a predefined pattern printed on a sheet of paper, an arbitrary image or pattern (e.g., a magazine advertisement), and/or other image or pattern. An augmented-reality marker may allow the user to position and/or size a selected virtual-wearable item within the main display portion. For example, in one implementation, the position of an augmented-reality-marker in the main display portion may correspond to the position of a virtual-wearable item in the main display portion. As such, the user may hold an augmented-reality marker in front of themselves while viewing the main display portion to position a virtual-wearable item so that it appears that the user is wearing the virtual-wearable item.

Some implementations may not require an augmented-reality marker to position and/or size a virtual-wearable item in the main display portion. For example, the motion-capture module may be configured to recognize position and/or orientation of one more body parts of the user in the main display portion in order to determine a position, size, and/or orientation for a given virtual-wearable item in the main display portion. Once the one or more body parts are recognized, the composite-imaging module may position a virtual-wearable item at a predetermined offset and/or orientation relative to the recognized one or more body parts.

The motion-capture module may track motion, position, and/or orientation of the user to overlay a virtual-wearable item on the user in the main display portion such that the virtual-wearable item appears to be worn by the user while the user moves about and/or rotates in the main display portion. Based on tracked motion, position and/or orientation of the user in the main display portion, a virtual-wearable item may move within the main display portion in order to track movements of the user. Characteristics associated with a virtual-wearable item (e.g., type of fabric, texture of fabric, and/or other characteristics) may be utilized in rendering the virtual-wearable item in the main display portion in order to enhance the realness of the appearance of the virtual-wearable item.

In some implementations, the motion-capture module may be configured to allow the user may interact with one or more portions of the virtual-outfitting interface by moving a body part (e.g., a finger, hand, and/or other body part) such that the body part, as depicted in the main display portion, lies within one or more portions. By way of non-limiting example, the user may move a hand such that it lies within the item-search/selection portion in order to select a virtual-wearable item, to effectuate a displayed virtual-wearable item included in the main display portion being replaced by a different selected virtual-wearable item such that the user appears to be wearing the different selected virtual-wearable item in the main display portion, to cycle through virtual-wearable items included in a queue of several virtual-wearable items, and/or to perform other functions associated with the item-search/selection portion.

The item-search/selection module may be configured to provide the current item details portion of the virtual-outfitting interface. The current item details portion may include one or more details of the real-wearable item that a user is currently trying on virtually using the system. Exemplary details that may be presented by the current item details portion include type, size, style, brand, vendor, price, availability, and/or other details associated with real-wearable items.

The conferencing module may be configured to provide the conferencing portion of the virtual-outfitting interface. The conferencing portion may display one or more other users of the system or similar system. The one or more other users displayed by the conferencing portion may be virtually trying on real-wearable items. A user of the virtual-outfitting interface may interact, such as by voice or text, with other users via the conferencing portion. This may give an enhanced sense of shopping with other users in disparate locations.

The tools portion of the virtual-outfitting interface may display one or more icons or other links to access tools provided by one or more of modules of the processor. Such tools may allow a user to perform one or more functions or manipulations within virtual-outfitting interface. The one or more tools may include a purchase tool, a screen-capture tool, a social-networking tool, a virtual-outfitting-interface-control tool, and/or other tools.

The purchase module may be configured provide the purchase tool included in the tools portion. The purchase tool may allow the user to indicate one or more virtual-wearable items to effectuate a purchase of one or more real-wearable items corresponding to the indicated one or more virtual-wearable items. The user may indicate one or more virtual-wearable items for purchase in conjunction with the motion-tracking module and/or a user interface associated with one of the client computing platforms. In some implementations, effectuating a purchase of a real-wearable item may include adding that item in a shopping cart associated with a virtual-commerce environment for future purchase.

The screen-capture module may be configured to provide the screen-capture tool included in the tools portion of the virtual-outfitting interface. The screen-capture tool may allow a user to obtain a snapshot of at least a region of the virtual-outfitting interface. Such a region may include some or all of the main display portion and/or some or all of other portions of the virtual-outfitting interface. A snapshot may include a still image and/or video clip of the user appearing to wear a real-wearable item that corresponds to a selected virtual-wearable items. The snapshot may be stored in the electronic storage, in one or more of the client computing platforms, and/or at another location. The motion-capture module may be configured to allow the user to interact with the screen-capture tool to effectuate a snapshot being obtained.

The snapshot portion may be provided by the screen-capture module in the tools portion of the virtual-outfitting interface. The snapshot portion may be used to view and/or otherwise manage one or more snapshots of the user virtually trying on a real-wearable item. The snapshot portion may display a representation of some or all of the snapshots. A snapshot may be represented, within the snapshot portion, by a thumbnail of the snapshot, a cropped version of the snapshot, and/or other representation of the snapshot. The motion-capture module may be configured to allow the user to interact with the snapshot portion in order to view and/or otherwise manage one or more snapshots represented in the snapshot portion.

The social-networking module may be configured to provide the social-networking tool in the tools portion of the virtual-outfitting interface. The social-networking tool may allow the user to interface with one or more social-networking services (e.g., Facebook™, MySpace™, Twitter™, Twitpic™, Flicker™, and/or other social-networking services) with which the user is associated. The social-networking tool may interface with a social-networking service in order to share a snapshot with one or more contacts of the user. The motion-capture module may be configured to allow the user to interact with the social-networking tool to effectuate functionalities attributed thereto.

The interface-control module may be configured to provide the virtual-outfitting-interface-control tool in the tools portion of the virtual-outfitting interface. The virtual-outfitting-interface-control tool may allow the user to control one or more aspects associated with the virtual-outfitting interface. For example, the virtual-outfitting-interface-control tool may allow the user to control which portions are included in the virtual-outfitting interface, positions and/or sizes of one or more portions in the virtual-outfitting interface, toggling the virtual-outfitting interface on or off, and/or other aspects associated with the virtual-outfitting interface.

Another aspect of the invention relates to a method for allowing a user to simulate wearing real-wearable items, according to one or more implementations of the invention. In some implementations, the method may be implemented in one or more processing devices (e.g., a digital processor, an analog processor, a digital circuit designed to process information, an analog circuit designed to process information, a state machine, and/or other mechanisms for electronically processing information).

At one operation, a virtual-outfitting interface is provided for presentation to a user. The virtual-outfitting-interface module may be executed to perform this operation in some implementations.

At another operation, an item-search/selection portion is provided within the virtual-outfitting interface. The item-search/selection portion may depict one or more virtual-wearable items corresponding to one or more real-wearable items. The item-search/selection module may be executed to perform this operation in some implementations.

At yet another operation, the user is allowed to select at least one virtual-wearable item from the item-search/selection portion. The item-search/selection module may be executed to perform this operation in some implementations.

At still another operation, a main display portion within the virtual-outfitting interface is provided. The main display portion may include a composite video feed that incorporates a video feed of the user and the selected at least one virtual-wearable item such that the user appears to be wearing the selected at least one virtual-wearable item in the main display portion. The composite-imaging module may be executed to perform this operation in some implementations.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
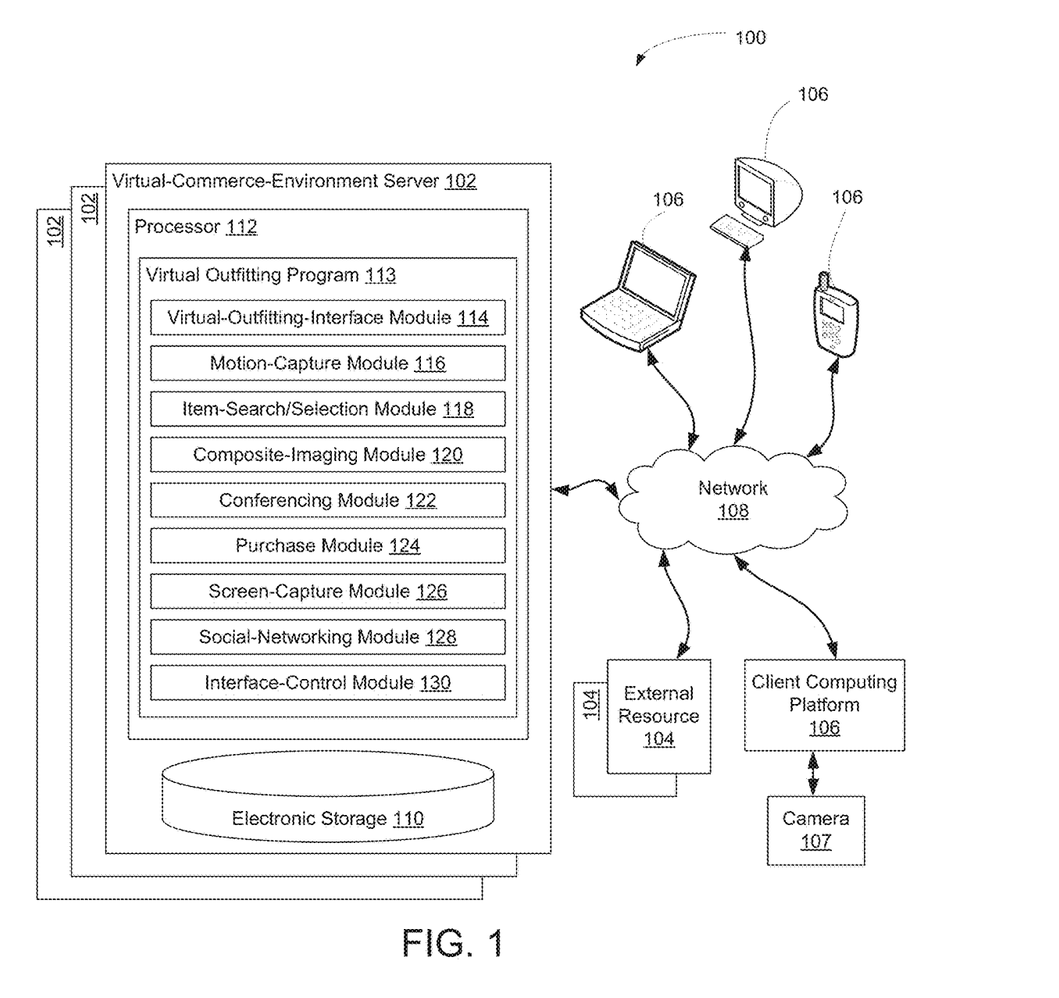
FIG. 1 illustrates a system configured provide a simulation of wearing real-wearable items, according to one or more implementations of the invention.

FIG. 1 illustrates a system 100 configured to provide a simulation of wearing real-wearable items, according to one or more implementations of the invention. According to exemplary implementations, the user may be presented one or more virtual-wearable items, such as via a user interface. The virtual-wearable items may include virtual garments (e.g., a virtual shirt, a virtual hat, virtual pants, and/or other virtual garments), virtual accessories (e.g., virtual jewelry, virtual hats, and/or other virtual accessories), and/or other virtual-wearable items. The virtual-wearable items may represent real-wearable items. The user may select at least one of the virtual-wearable item to virtually "try on" at least one corresponding real-wearable item. A composite image may be presented to the user in real time or near-real time, which may incorporate a live video feed of the user and one or more selected virtual-wearable items such that the user appears to be wearing real-wearable items corresponding to the selected virtual-wearable item(s) in the composite video feed.

In some implementations, the user may be presented a virtual-outfitting interface. The virtual-outfitting interface may include several portions, one of which may include the composite video feed. Various inputs such as motions of the user may be tracked such that the user may interact with one or more of the portions of the virtual-outfitting interface. For example, the user may change the virtual-wearable item displayed, purchase a real-wearable item associated with a displayed virtual-wearable item, obtain a snapshot or video clip of the user virtually wearing a real-wearable item, share snapshots or video clips such as via social-networking services, view and interact with friends that are also virtually trying on real-wearable items, and/or perform other actions in conjunction with the system 100.

In some implementations, the system 100 may include one or more virtual-commerce-environment servers 102 and/or other components. The system 100 may operate in communication and/or coordination with one or more external resources 104. Users may interface with the system 100 and/or the external resources 104 via client computing platforms 106. Components of the system 100, the virtual-commerce-environment servers 102, the external resources 104, and/or the client computing platforms 106 may be operatively linked via one or more electronic communication links. For example, such electronic communication links may be established, at least in part, via a network 108, which may include the Internet and/or other networks. It will be appreciated that this is not intended to be limiting, and that the scope of this disclosure includes implementations in which the virtual-commerce-environment servers 102, the external resources 104, and/or the client computing platforms 106 are operatively linked via some other communication media.

A given client computing platform 106 may include one or more processors configured to execute computer program modules. The computer program modules may be configured to enable one or more users associated with the given client computing platform 106 to interface with the system 100 and/or the external resources 104, and/or provide other functionality attributed herein to client computing platforms 106. A given client computing platform 106 may also be communicatively coupled with an imaging device (e.g., camera 107) or have such an imaging device integrated therewith. Examples of imaging devices that may be included as the camera 107 may include an analog camera, a digital camera, a 2D camera, a stereo camera, a 3D camera, and/or other imaging devices. An imaging device may be configured to capture still images and/or a live video feed of a user of a given client computing platform 106. Imaging devices associated with individual ones of the client computing platforms 106 may be configured to provide information (e.g., a video feed, one or more images, and/or other information) to one or more modules associated with the virtual-commerce-environment servers 102. By way of non-limiting example, the given client computing platform 106 may include one or more of a desktop computer, a laptop computer, a handheld computer, a NetBook, a Smartphone, and/or other computing platforms.

Individual ones of the client computing platforms 106 may include user interfaces. A user interface included in a given client computing platform 106 may be configured to provide an interface between the virtual-commerce-environment servers 102 and a user of the given client computing platform 106 through which the user may provide information to and/or receive information from the virtual-commerce-environment servers 102. This enables data, results, and/or instructions and any other communicable items, collectively referred to as "information," to be communicated between the user and virtual-commerce-environment servers 102. Exemplary information provided to and/or received from the virtual-commerce-environment servers 102 via a user interface of one of the client computing platforms 106 may include one or more of selection of one or more virtual-wearable items, interactions with media provided by the virtual-commerce-environment servers 102, and/or other information. Examples of interface devices suitable for inclusion in a user interface of one of the client computing platforms 106 include one or more of a keypad, buttons, switches, a keyboard, knobs, levers, a display screen, a touch screen, speakers, a microphone, an indicator light, an audible alarm, and/or a printer. It is to be understood that other communication techniques, either hard-wired or wireless, are also contemplated by the present invention as a user interface of individual ones of the client computing platforms 106. As such, any technique for communicating information with the virtual-commerce-environment servers 102 is contemplated by the present invention as a user interface a given client computing platform 106.

The external resources 104 may include sources of information, hosts and/or providers of virtual commerce environments outside of the system 100, external entities participating with the system 100, and/or other resources. In some implementations, some or all of the functionality attributed herein to the external resources 104 may be provided by resources included in the system 100.

The virtual-commerce-environment servers 102 may comprise electronic storage 110, one or more processors 112, and/or other components. The virtual-commerce-environment servers 102 may include communication lines, or ports to enable the exchange of information with a network and/or other computing platforms. Although system 100 may be described in certain sections herein as including virtual-commerce-environment servers 102, this is not intended to be limiting. The virtual-commerce-environment servers 102 may be separate and distinct from the system 100, and may be provided by an entity that is separate from, for example, one or more components of the system 100.

The electronic storage 110 may comprise electronic storage media that electronically stores information. The electronic storage media of the electronic storage 110 may include one or both of system storage that is provided integrally (i.e., substantially non-removable) with the virtual-commerce-environment servers 102 and/or removable storage that is removably connectable to the virtual-commerce-environment servers 102 via, for example, a port (e.g., a USB port, a firewire port, etc.) or a drive (e.g., a disk drive, etc.). The electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may store software algorithms, information determined by processors 112, information received from client computing platforms 106, information received from the external resources 104, and/or other information that enables the virtual-commerce-environment servers 102 to function as described herein.

The processor(s) 112 may be configured to provide information processing capabilities in the virtual environments servers 102. As such, the processor 112 may include one or more of a digital processor, an analog processor, a digital circuit designed to process information, an analog circuit designed to process information, a state machine, and/or other mechanisms for electronically processing information. Although the processor 112 is shown in FIG. 1 as a single entity, this is for illustrative purposes only. In some implementations, processor 112 may include a plurality of processing units. These processing units may be physically located within the same device, or the processor 112 may represent processing functionality of a plurality of devices operating in coordination.

As is shown in FIG. 1, the processor 112 may be configured to execute a virtual outfitting program 113. The virtual outfitting program 113 may include one or more computer program modules and/or instructions that may be executed to provide a simulation of wearing real-wearable items. The one or more computer program modules may include one or more of a virtual-outfitting-interface module 114, a motion-capture module 116, an item-search/selection module 118, a composite-imaging module 120, a conferencing module 122, a purchase module 124, a screen-capture module 126, a social-networking module 128, an interface-control module 130, and/or other modules. The processor 112 may be configured to execute modules 114, 116, 118, 120, 122, 124, 126, 128, and/or 130 by software; hardware; firmware; some combination of software, hardware, and/or firmware; and/or other mechanisms for configuring processing capabilities on the processor 112.

It should be appreciated that although modules 114, 116, 118, 120, 122, 124, 126, 128, and 130 are illustrated in FIG. 1 as being co-located within a single processing unit, in implementations in which the processor 112 includes multiple processing units, one or more of modules 114, 116, 118, 120, 122, 124, 126, 128, and/or 130 may be located remotely from the other modules. The description of the functionality provided by the different modules 114, 116, 118, 120, 122, 124, 126, 128, and/or 130 described below is for illustrative purposes, and is not intended to be limiting, as any of modules 114, 116, 118, 120, 122, 124, 126, 128, and/or 130 may provide more or less functionality than is described. For example, one or more of modules 114, 116, 118, 120, 122, 124, 126, 128, and/or 130 may be eliminated, and some or all of its functionality may be provided by other ones of modules 114, 116, 118, 120, 122, 124, 126, 128, and/or 130. As another example, processor 112 may be configured to execute one or more additional modules that may perform some or all of the functionality attributed below to one of modules 114, 116, 118, 120, 122, 124, 126, 128, and/or 130.

Figure 2:
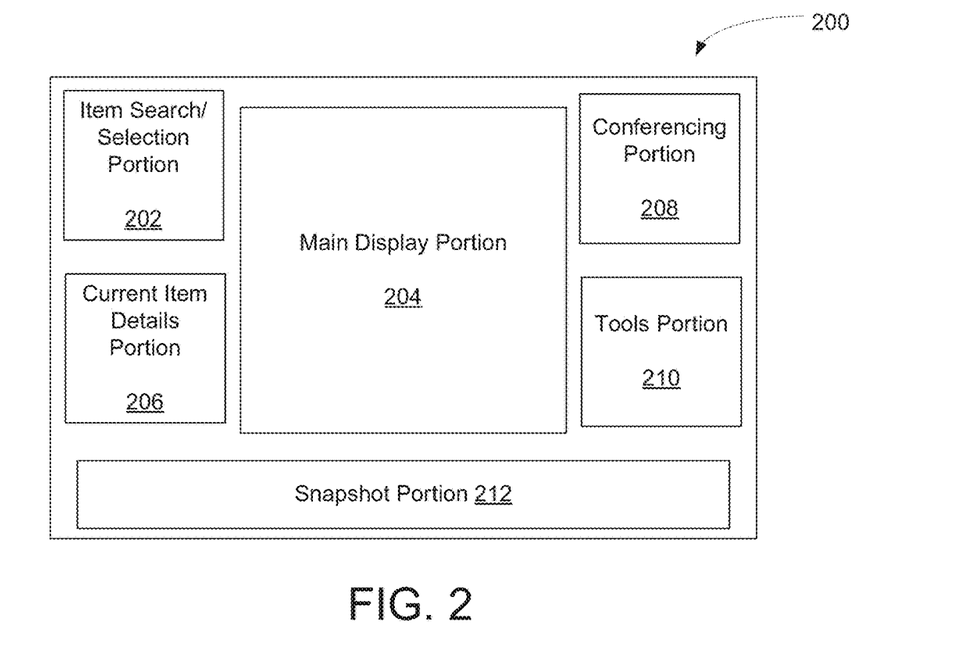
FIG. 2 illustrates a virtual-outfitting interface, according to one or more implementations of the invention.

The virtual-outfitting-interface module 114 may be configured to provide, for presentation to one or more users, a virtual-outfitting interface. The virtual-outfitting interface may be presented to a user via a user interface of a given client computing platform 106. An exemplary virtual-outfitting interface 200, in accordance with one or more implementations, is illustrated in FIG. 2. As depicted in FIG. 2, the virtual-outfitting interface 200 includes an item-search/selection portion 202, a main display portion 204, a current item details portion 206, a conferencing portion 208, a tools portion 210, a snapshot portion 212, and/or other portions. Although the virtual-outfitting interface 200 is depicted as including portions 202-212, this is not intended to be limiting as one or more portioned may be omitted, one or more portions may be added, and/or one or more portions may be combined into a single portion. Furthermore, functionalities attributed to a single portion may be implemented at more than one position within the virtual-outfitting interface 200. It is also appreciated that one or more of the portions may overlap one or more other portions. In some embodiments, the size and/or position attributed to a given portion within the virtual-outfitting interface 200 may be dynamic.

A user may interact with one or more portions 202-212 of the virtual-outfitting interface 200. In some implementations, the user may interact with one or more portions 202-212 via a user interface associated with a given client computing platform 106. For example, a user may use a mouse to click within a given portion to perform one or more functions described herein. The user may interact with one or more portions 202-212 by voice command, according to some implementations. The user may interact with one or more portions 202-212, in accordance with some implementations, using motions and/or gestural commands.

The motion-capture module 116 may be configured to track motion of the user. Motion of the user tracked by the motion-capture module 116 may allow the user to interact with one or more portions 202-212 of the virtual-outfitting interface 200. Such interactions may include gestural commands and/or other commands associated with motions of the user. The motion-capture module 116 may utilize images and/or video of the user obtained by an imaging device associated with one of the client computing platforms 106 in order to track motion of the user. Exemplary implementations of motion tracking and utilization thereof are described further in connection with one or more portions 202-212.

The item-search/selection module 118 may be configured to provide the item-search/selection portion 202 of the virtual-outfitting interface 200. The item-search/selection portion 202 may present one or more virtual-wearable items to a user. As mentioned above, virtual-wearable items may include one or more of a virtual garment, a virtual accessory, and/or other virtual-wearable items. In some implementations, a given virtual-wearable item may represent a real-wearable item. By way of non-limiting example, a virtual-wearable item may pictorially depict, and thus represent, a Nike® tee shirt or other tangible items that may be worn by the user. In some implementations, the item-search/selection portion 202 may display an image or other representation (e.g., a textual representation) of a virtual-wearable item. The user may manipulate the item-search/selection portion 202 using an interface included in a given client computing platform 106 and/or other techniques described herein, such as gestures and/or voice commands.

According to some implementations, the item-search/selection module 118 may be configured to allow a user to search available virtual-wearable items. Available items may be presented in the item-search/selection portion 202, and may be searched according to type, size, style, brand, vendor, price, availability, and/or other attributes associated with real-wearable items. In some implementations, some or all searching capabilities may be provided by a third-party service (e.g., Amazon.com™, Google™, and/or other third parties). The item-search/selection module 118 may be configured to provide suggestions of one or more real-wearable items based on one or more search criterions inputted by the user.

In some implementations, the item-search/selection module 118 may be configured to allow a user to select one or more virtual-wearable items presented in the item-search/selection portion 202. Selected virtual-wearable items may be "tried-on" virtually by the user, as described further herein. In some implementations, one or more virtual-wearable items presented in the item-search/selection portion 202 may be pre-selected by one or more users, such as via an online storefront.

The item-search/selection module 118 may be configured to manage a queue of selected virtual-wearable items, in some implementations. Some or all of the queue of selected virtual-wearable items may be presented in the item-search/selection portion 202. The user may add, subtract, reorder, scroll through, browse, and/or otherwise manage selected virtual-wearable items included in such a queue. Some implementations may include a default queue that includes a predetermined set of virtual-wearable items. The user may select one or more virtual-wearable items from to queue in order to virtually "try on" real-wearable items corresponding to selected virtual-wearable items.

The composite-imaging module 120 may be configured to provide the main display portion 204 of the virtual-outfitting interface 200. The main display portion 204 may include one or more images and/or video of the user virtually trying on one or more real-wearable items that correspond to one or more selected virtual-wearable items. In such images and/or video, the one or more selected virtual-wearable items may be visually overlaid on the user in a position in which the user would normally wear corresponding real-wearable items. The position of the virtual-wearable item in the main display portion 204 may be determined manually by the user (e.g., drag and drop) using a user interface of a given client computing platforms 106, and/or may be determined wholly or partially by the motion-capture module 116, as described further herein. In some implementations, the main display portion 204 may include a composite video feed that incorporates a video feed of the user and one or more virtual-wearable items selected by the user via the item-search/selection module 118. The video feed of the user may be obtained by an imaging device associated with one of the client computing platforms 106. Presentation of the composite video feed may be in real time or near-real time.

The motion-capture module 116 may be configured to position and/or size a virtual-wearable item relative to the user's body in an image and/or video in the main display portion 204. Some implementations may utilize augmented reality technology to position a virtual-wearable item relative to the user's body. The motion-capture module 116 may utilize an augmented-reality marker in order position a virtual-wearable item. An augmented-reality marker may include a predefined pattern printed on a sheet of paper, an arbitrary image or pattern (e.g., a magazine advertisement), and/or other image or pattern. An augmented-reality marker may allow the user to position and/or size a selected virtual-wearable item within the main display portion 204. For example, in one implementation, the position of an augmented-reality-marker in the main display portion 204 may correspond to the position of a virtual-wearable item in the main display portion 204. As such, the user may hold an augmented-reality marker in front of themselves while viewing the main display portion 204 to position a virtual-wearable item so that it appears that the user is wearing the virtual-wearable item.

Some implementations may not require an augmented-reality marker to position and/or size a virtual-wearable item in the main display portion 204. For example, the motion-capture module 116 may be configured to recognize position and/or orientation of one more body parts of the user in the main display portion 204 in order to determine a position, size, and/or orientation for a given virtual-wearable item in the main display portion 204. Once the one or more body parts are recognized, the composite-imaging module 120 may position a virtual-wearable item at a predetermined offset and/or orientation relative to the recognized one or more body parts.

The motion-capture module 116 may track motion, position, and/or orientation of the user to overlay a virtual-wearable item on the user in the main display portion 204 such that the virtual-wearable item appears to be worn by the user while the user moves about and/or rotates in the main display portion 204. Based on tracked motion, position and/or orientation of the user in the main display portion 204, a virtual-wearable item may move within the main display portion 204 in order to track movements of the user. Characteristics associated with a virtual-wearable item (e.g., type of fabric, texture of fabric, and/or other characteristics) may be utilized in rendering the virtual-wearable item in the main display portion 204 in order to enhance the realness of the appearance of the virtual-wearable item.

In some implementations, the motion-capture module 116 may be configured to allow the user may interact with one or more portions 202-212 of the virtual-outfitting interface 200 by moving a body part (e.g., a finger, hand, and/or other body part) such that the body part, as depicted in the main display portion 204, lies within one or more portions 202-212. By way of non-limiting example, the user may move a hand such that it lies within the item-search/selection portion 202 in order to select a virtual-wearable item, to effectuate a displayed virtual-wearable item included in the main display portion 204 being replaced by a different selected virtual-wearable item such that the user appears to be wearing the different selected virtual-wearable item in the main display portion 204, to cycle through virtual-wearable items included in a queue of several virtual-wearable items, and/or to perform other functions associated with the item-search/selection portion 202.

The item-search/selection module 118 may be configured to provide the current item details portion 206 of the virtual-outfitting interface 200. The current item details portion 206 may include one or more details of the real-wearable item that a user is currently trying on virtually using the system 100. Exemplary details that may be presented by the current item details portion 206 include type, size, style, brand, vendor, price, availability, and/or other details associated with real-wearable items.

The conferencing module 122 may be configured to provide the conferencing portion 208 of the virtual-outfitting interface 200. The conferencing portion 208 may display one or more other users of the system 100 or similar system. The one or more other users displayed by the conferencing portion 208 may be virtually trying on real-wearable items. A user of the virtual-outfitting interface 200 may interact, such as by voice or text, with other users via the conferencing portion 208. This may give an enhanced sense of shopping with other users in disparate locations.

The tools portion 210 of the virtual-outfitting interface 200 may display one or more icons or other links to access tools provided by one or more of modules of the processor 112. Such tools may allow a user to perform one or more functions or manipulations within virtual-outfitting interface 200. The one or more tools may include a purchase tool, a screen-capture tool, a social-networking tool, a virtual-outfitting-interface-control tool, and/or other tools.

The purchase module 124 may be configured provide the purchase tool included in the tools portion 210. The purchase tool may allow the user to indicate one or more virtual-wearable items to effectuate a purchase of one or more real-wearable items corresponding to the indicated one or more virtual-wearable items. The user may indicate one or more virtual-wearable items for purchase in conjunction with the motion-tracking module 122 and/or a user interface associated with one of the client computing platforms 106. In some implementations, effectuating a purchase of a real-wearable item may include adding that item in a shopping cart associated with a virtual-commerce environment for future purchase.

The screen-capture module 126 may be configured to provide the screen-capture tool included in the tools portion 210 of the virtual-outfitting interface 200. The screen-capture tool may allow a user to obtain a snapshot of at least a region of the virtual-outfitting interface 200. Such a region may include some or all of the main display portion 204 and/or some or all of other portions of the virtual-outfitting interface 200. A snapshot may include a still image and/or video clip of the user appearing to wear a real-wearable item that corresponds to a selected virtual-wearable items. The snapshot may be stored in the electronic storage 110, in one or more of the client computing platforms 106, and/or at another location. The motion-capture module 116 may be configured to allow the user to interact with the screen-capture tool to effectuate a snapshot being obtained.

The snapshot portion 212 may be provided by the screen-capture module 126 in the tools portion 210 of the virtual-outfitting interface 200. The snapshot portion 212 may be used to view and/or otherwise manage one or more snapshots of the user virtually trying on a real-wearable item. The snapshot portion 212 may display a representation of some or all of the snapshots. A snapshot may be represented, within the snapshot portion 212, by a thumbnail of the snapshot, a cropped version of the snapshot, and/or other representation of the snapshot. The motion-capture module 116 may be configured to allow the user to interact with the snapshot portion 212 in order to view and/or otherwise manage one or more snapshots represented in the snapshot portion 212.

The social-networking module 128 may be configured to provide the social-networking tool in the tools portion 210 of the virtual-outfitting interface 200. The social-networking tool may allow the user to interface with one or more social-networking services (e.g., Facebook™ MySpace™, Twitter™, Twitpic™, Flicker™, and/or other social-networking services) with which the user is associated. The social-networking tool may interface with a social-networking service in order to share a snapshot with one or more contacts of the user. By way of non-limiting example, the social-networking tool may interface with Facebook™ by entering the snapshot with an associated comment on the profile page of the user. The comment may include a link (e.g., a uniform resource locator (URL)) to content (e.g., a website) and/or information associated with a real-wearable item depicted in a snapshot. The motion-capture module 116 may be configured to allow the user to interact with the social-networking tool to effectuate functionalities attributed thereto.

The interface-control module 130 may be configured to provide the virtual-outfitting-interface-control tool in the tools portion 210 of the virtual-outfitting interface 200. The virtual-outfitting-interface-control tool may allow the user to control one or more aspects associated with the virtual-outfitting interface 200. For example, the virtual-outfitting-interface-control tool may allow the user to control which portions 202-212 are included in the virtual-outfitting interface 200, positions and/or sizes of one or more portions 202-212 in the virtual-outfitting interface 200, toggling the virtual-outfitting interface 200 on or off, and/or other aspects associated with the virtual-outfitting interface 200.

Figure 3:
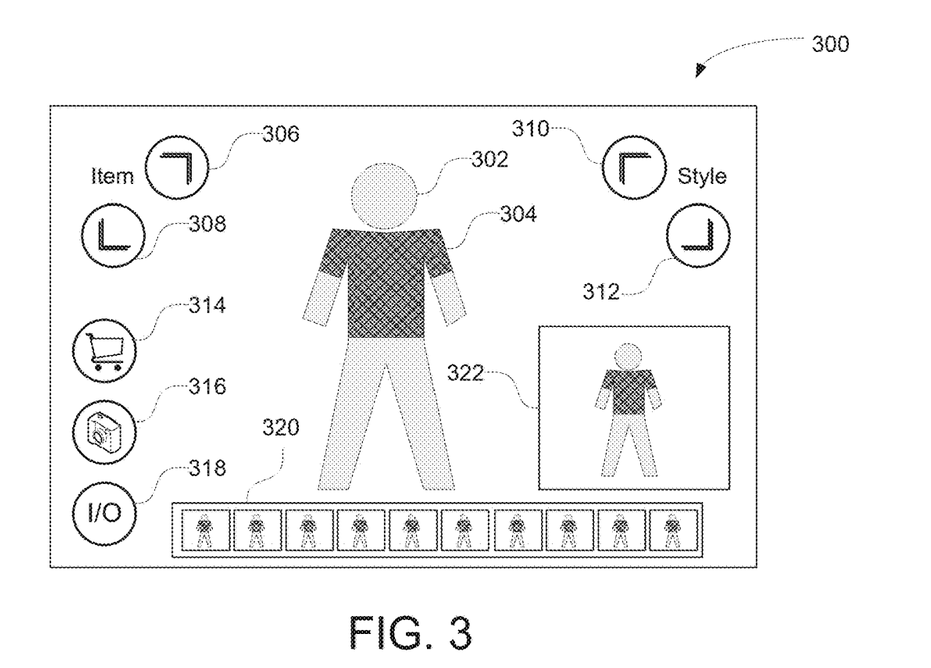
FIG. 3 illustrates an exemplary virtual-outfitting interface, according to one or more implementations of the invention.

FIG. 3 illustrates an exemplary virtual-outfitting interface 300, according to one or more implementations of the invention. The virtual-outfitting interface 300 may include a depiction of a user 302 with a virtual-wearable item 304 overlaid on the user 302 such that the user appears to be trying on real-wearable item that corresponds to the virtual-wearable item 304. The user 302 and the virtual-wearable item 304 may be included in a main display portion of the virtual-outfitting interface 300 similar to the main display portion 204 described in connection with FIG. 2. Various functionalities described in connection with portions 202-212 of the virtual-outfitting interface 200 of FIG. 2 may be represented or linked to by icons. The user 302 may interact with one or more icons by using a user interface associated with one of the client computing platforms 106, by voice command, by performing certain motions as described in connection with the motion-capture module 116, and/or by other interactions.

In the virtual-outfitting interface 300, icons 306, 308, 310, and 312 may provide functionalities attributed to the item-search/selection portion 202 of FIG. 2. More specifically, the icons 306 and 308 may allow the user 302 to select a virtual-wearable item to try on in the virtual-outfitting interface 300. The icons 310 and 312 may allow the user 302 to choose a style of a virtual-wearable item. The icon 314 may correspond to the purchasing tool described in connection with the purchase module 124. The icon 316 may correspond to the screen-capture tool described in connection with the screen-capture module 126. The icon 318 may correspond to the virtual-outfitting-interface-control tool described in connection with the interface-control module 130. The frame 318 may correspond to the snapshot portion 212 of FIG. 2. The frame 322 may correspond to the conferencing portion 208 of FIG. 2.

Figure 4:
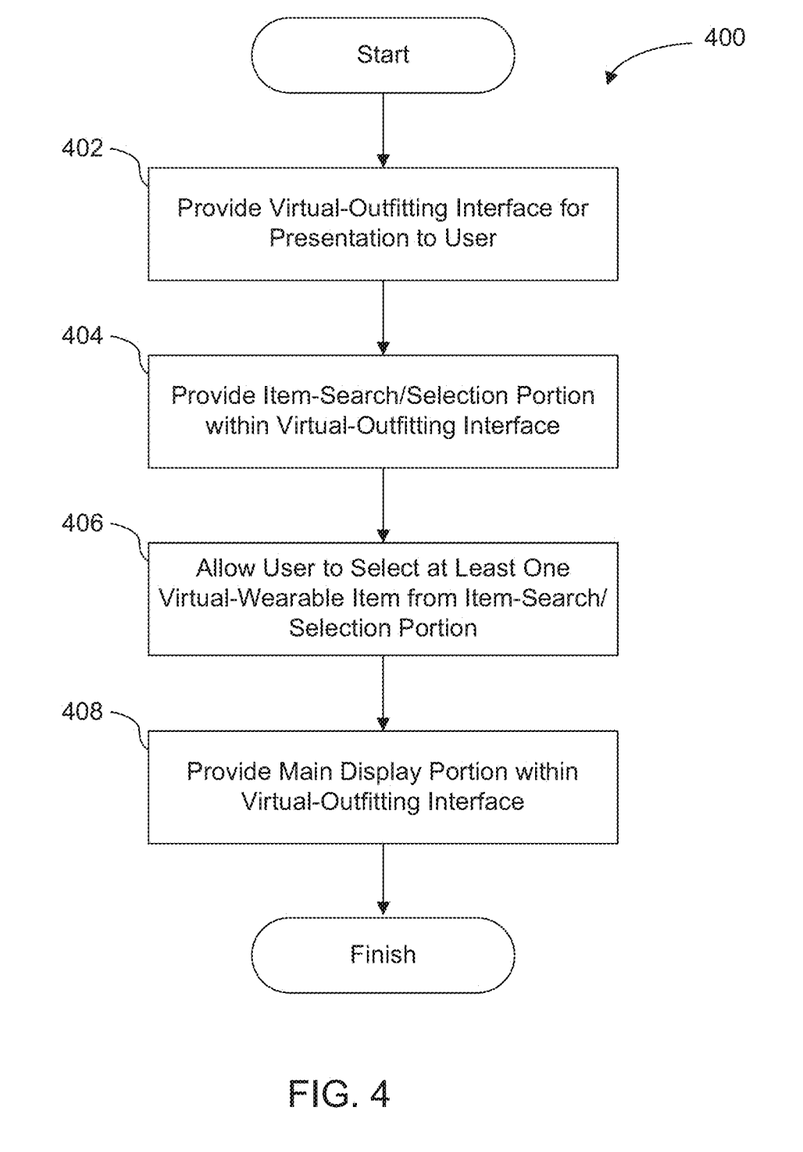
FIG. 4 illustrates a method for allowing a user to simulate wearing real-wearable items, according to one or more implementations of the invention.

FIG. 4 illustrates a method 400 for allowing a user to simulate wearing real-wearable items, according to one or more implementations of the invention. The operations of the method 400 presented below are intended to be illustrative. In some implementations, the method 400 may be accomplished with one or more additional operations not described, and/or without one or more of the operations discussed. Additionally, the order in which the operations of the method 400 are illustrated in FIG. 4 and described below is not intended to be limiting.

In some implementations, the method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 400 in response to instructions stored electronically on an electronic storage medium. The one or more processing devices may include one or more devices configured through hardware, firmware, and/or software to be specifically designed for execution of one or more of the operations of the method 400.

At an operation 402, a virtual-outfitting interface is provided for presentation to a user. The virtual-outfitting-interface module 114 may be executed to perform the operation 402 in some implementations.

At an operation 404, an item-search/selection portion is provided within the virtual-outfitting interface. The item-search/selection portion may depict one or more virtual-wearable items corresponding to one or more real-wearable items. The item-search/selection module 118 may be executed to perform the operation 404 in some implementations.

At an operation 406, the user is allowed to select at least one virtual-wearable item from the item-search/selection portion. The item-search/selection module 118 may be executed to perform the operation 406 in some implementations.

At an operation 408, a main display portion within the virtual-outfitting interface is provided. The main display portion may include a composite video feed that incorporates a video feed of the user and the selected at least one virtual-wearable item such that the user appears to be wearing the selected at least one virtual-wearable item in the main display portion. The composite-imaging module 120 may be executed to perform the operation 408 in some implementations. Although not depicted in FIG. 4, the method 400 may include operations consistent with the functions described herein of one or more of the modules 114, 116, 118, 120, 122, 124, 126, 128, and/or 130.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured for allowing a user to simulate wearing real-wearable items, the system comprising:
   one or more hardware processors configured by machine-readable instructions to:
   obtain, from a client computing platform, a live video feed;
   recognize a position and/or orientation of one or more body parts of a user within the live video feed, the one or more body parts including a first body part;
   provide a virtual-outfitting interface for presentation to the user via the client computing platform, the virtual-outfitting interface including two or more separate portions simultaneously presented in the virtual-outfitting interface, the two or more separate portions including a main display portion and an icon that is overlaid upon the main display portion,
   wherein the main display portion includes a composite video feed that incorporates the live video feed of the user and a first virtual-wearable item, and wherein a position, size, and/or orientation of the first virtual-wearable item is determined such that the first virtual-wearable item moves within the main display portion according to the position and/or orientation of the user within the live video feed so that the user appears to be wearing the first virtual-wearable item in real time in the main display portion; and provide a social-networking tool graphically presented in the virtual-outfitting interface, the social-networking tool allowing the user to interface with one or more social-networking services with which the user is associated.

2. The system of claim 1, wherein interfacing with a given social-networking service includes sharing a snapshot with one or more contacts of the user within the given social-networking service.

3. The system of claim 1, wherein interfacing with a given social-networking service includes providing a comment on a profile page of the user within the given social-networking service, wherein the comment on the profile page includes one or both of a link or information associated with a real-wearable item corresponding to the first virtual-wearable item.

4. The system of claim 1, wherein the social-networking tool in the virtual-outfitting interface is configured to allow the user to interact with the one or more social-networking services using one or more gestural commands including a first gestural command, the first gestural command being detected responsive to a determination that the user moved the first body part during the live video stream such that within the social-networking tool a live video depiction of the first body part lies at the same position as the icon.

5. The system of claim 4, wherein the first body part is a hand of the user, one or more fingers of the user, or the hand and the one or more fingers of the user.

6. The system of claim 1, wherein:
the first virtual-wearable item includes one or both of a virtual garment or a virtual accessory; or
the first virtual-wearable item visually represents a corresponding real-wearable item.

7. The system of claim 1, wherein the two or more separate portions of the virtual-outfitting interface further include a conferencing portion configured to display video of one or more other users, the conferencing portion being configured to facilitate video communications between the user and at least one of the one or more other users via the one or more social-networking services with which the user is associated.

8. The system of claim 1, wherein the one or more processors are further configured by machine-readable instructions to:
provide a screen-capture tool in the virtual-outfitting interface, the screen-capture tool allowing the user to obtain a snapshot of at least one region of the virtual-outfitting interface via a command, the social-networking tool being further configured to allow the user to share the snapshot via the one or more social-networking services with which the user is associated, wherein the command comprises a gesture or a voice command.

9. The system of claim 1, wherein a size and/or position attributed to the two or more separate portions of the virtual-outfitting interface is dynamic.

10. The system of claim 1, wherein the one or more hardware processors are further configured by the machine-readable instructions to:
determine the position, size, and/or orientation of the first virtual-wearable item based on the position and/or orientation of the one or more body parts of the user recognized within the live video feed, wherein the first virtual-wearable item is positioned at a predetermined offset and/or orientation relative to the one or more body parts of the user.

11. The system of claim 1, wherein the position, size, and/or orientation of the first virtual-wearable item is determined based on a position of an augmented-reality marker in the main display portion.

12. The system of claim 1, wherein one or more characteristics of the first virtual-wearable item are utilized to render the first virtual-wearable item in the main display portion to enhance a realness of the first virtual-wearable item as it appears within the main display portion.

13. A method for allowing a user to simulate wearing real-wearable items, the method being performed by one or more hardware processors configured by machine-readable instructions, the method comprising:
obtaining, from a client computing platform, a live video feed;
recognizing a position and/or orientation of one or more body parts of a user within the live video feed, the one or more body parts including a first body part;
providing a virtual-outfitting interface for presentation to the user via the client computing platform, the virtual-outfitting interface including two or more separate portions simultaneously presented in the virtual-outfitting interface, the two or more separate portions including a main display portion and an icon that is overlaid upon the main display portion, wherein the main display portion includes a composite video feed that incorporates the live video feed of the user and a first virtual-wearable item, and wherein a position, size, and/or orientation of the first virtual-wearable item is determined such that the first virtual-wearable item moves within the main display portion according to the position and/or orientation of the user within the live video feed so that the user appears to be wearing the first virtual-wearable item in real time in the main display portion; and
providing a social-networking tool graphically presented in the virtual-outfitting interface, the social-networking tool allowing the user to interface with one or more social-networking services with which the user is associated.

14. The method of claim 13, wherein interfacing with a given social-networking service includes sharing a snapshot with one or more contacts of the user within the given social-networking service.

15. The method of claim 13, wherein interfacing with a given social-networking service includes providing a comment on a profile page of the user within the given social-networking service, wherein the comment on the profile page includes one or both of a link or information associated with a real-wearable item corresponding to the first virtual-wearable item.

16. The method of claim 13, further comprising:
determining, based on a detected a first gestural command, that the user moved the first body part during the live video stream such that within the social-networking tool a live video depiction of the first body part lies at the same position as the icon, wherein the social network tool is configured to allow the user to interact with the one or more social-networking services using one or more gestural commands including the first gestural command.

17. The method of claim 16, wherein the first body part is a hand of the user, one or more fingers of the user, or the hand and the one or more fingers of the user.

18. The method of claim 13, wherein:
the first virtual-wearable item includes one or both of a virtual garment or a virtual accessory; or the first virtual-wearable item visually represents a corresponding real-wearable item.

19. The method of claim 13, wherein the two or more separate portions of the virtual-outfitting interface further include a conferencing portion, wherein providing the virtual-outfitting interface for presentation further comprises:

providing video of one or more other users for display within the conferencing portion, wherein the conferencing portion is configured to facilitate video communications between the user and at least one of the one or more other users via the one or more social-networking services with which the user is associated.

20. The method of claim 13, further comprising:

providing a screen-capture tool in the virtual-outfitting interface, the screen-capture tool allowing the user to obtain a snapshot of at least one region of the virtual-outfitting interface via a command, the social-networking tool being further configured to allow the user to share the snapshot via the one or more social-networking services with which the user is associated, wherein the command comprises a gesture or a voice command.

* * * * *